(12) United States Patent
Lee (10) Patent No.: US 12,124,916 B1
(45) Date of Patent: Oct. 22, 2024

(54) RFID READER AND RFID SYSTEM INCLUDING THE SAME

(71) Applicant: NORIAND CO.,LTD.

(72) Inventor: Hyejin Lee, Gyeonggi-do (KR)

(73) Assignee: NORIAND CO., LTD., Seoul (KR)

( * ) Notice: Subject to any disclaimer, the term of this patent is extended or adjusted under 35 U.S.C. 154(b) by 0 days.

(21) Appl. No.: 18/228,694

(22) Filed: Aug. 1, 2023

(30) Foreign Application Priority Data

Jul. 4, 2023 (KR) .......................... 10-2023-0086697

(51) Int. Cl.
*G06K 7/10* (2006.01)

(52) U.S. Cl.
CPC ................................. *G06K 7/10396* (2013.01)

(58) Field of Classification Search
CPC ........... G06K 7/10346; G06K 7/10366; G06K 7/10376; G06K 7/10386; G06K 7/10396; H01Q 1/27; H01Q 1/273
See application file for complete search history.

(56) References Cited

U.S. PATENT DOCUMENTS

| | | | | |
|---|---|---|---|---|
| 11,803,717 B2 * | 10/2023 | Lim | ..................... | G07G 1/0081 |
| 2010/0237997 A1 * | 9/2010 | Asai | ................... | G06K 7/10346 340/10.1 |
| 2014/0249944 A1 * | 9/2014 | Hicks | ................... | G07G 1/0081 235/383 |

FOREIGN PATENT DOCUMENTS

| | | |
|---|---|---|
| JP | 2023-087264 A | 6/2023 |
| KR | 10-1324306 B1 | 11/2013 |
| KR | 10-2018-0058945 A | 6/2018 |
| KR | 10-2023-0094530 A | 6/2023 |
| KR | 10-2023-0095426 A | 6/2023 |
| KR | 10-2550027 B1 | 6/2023 |
| WO | WO-2021157784 A1 * | 8/2021 ........... G06K 7/0004 |

OTHER PUBLICATIONS

KIPO, Notification of Preliminary Examination Result, Korean Patent Application No. 10-2023-0086697, Jul. 20, 2023, 8 pages.
KIPO, Decision to Grant a Patent, Korean Patent Application No. 10-2023-0086697, Sep. 11, 2023, 17 pages.
1153 Bluetooth Wearable UHF RFID Reader Datasheet V2.07, Technology Solutions, https://www.tsl.com/wp-content/uploads/1153-Bluetooth-UHF-Reader-Datasheet.pdf (Dec. 16, 2022).

* cited by examiner

*Primary Examiner* — Sonji N Johnson
*Assistant Examiner* — April A Taylor
(74) *Attorney, Agent, or Firm* — Nicholas Park (57) ABSTRACT

Disclosed are a radio frequency identification (RFID) reader and an RFID system including the same. The disclosed RFID reader may include an RFID reader body having a body that extends in a vertical direction and a protruding portion that protrudes rearward from an upper end of the body, an operation button being provided on a top surface of the protruding portion and a recess space being provided at the rear of the body under the protruding portion; a first back cover device detachably coupled to a rear surface of the body and having a band-type wearable member configured to be held by a user's hand or worn on the user's wrist; and a second back cover device detachably coupled to the rear surface of the body and having a pad mounting device configured to mount a pad type host device.

1 Claim, 10 Drawing Sheets

RFID READER AND RFID SYSTEM INCLUDING THE SAME

CROSS-REFERENCE TO RELATED APPLICATION

This application claims priority from and the benefit of Korean Patent Application No. 10-2023-0086697 filed on Jul. 4, 2023, which is hereby incorporated by reference in its entirety.

BACKGROUND

Technical Field

The present disclosure relates to information identification technology and a related device and system, and more particularly, to a radio frequency identification (RFID) reader and an RFID system including the same.

Related Art

Radio frequency identification (RFID) refers to a method of identifying information, for example, a type of ID, using a frequency. In RFID technology, information may be recognized at a long distance using radio waves and communication may be performed using electromagnetic induction. Here, an RFID tag and an RFID reader are used. The RFID tag includes an antenna and an integrated circuit, records information in the integrated circuit, and transmits information to the RFID reader through the antenna. This information is used to identify an object to which the RFID tag is attached. The RFID performs an identification function similar to a barcode, but differs from a barcode system in that radio waves are used rather than light. Therefore, the RFID reader may read a tag even at a long distance instead of operating only at a short distance like a barcode reader, and may receive information through an object that is present in between.

The RFID may have various advantages, for example, a semi-permanent use, a large-capacity memory built-in, a recognizability while moving, a recognizability at a long distance in a non-contact manner, a repeated reuse, a capability of simultaneously recognizing multi-tag information, a high data reliability, an easy data conversion and storage, a capability of integrating with a network such as the Internet, a reduction in operation cost and management cost, and low maintenance cost compared to other recognition devices.

The RFID technology may be usefully employed in various fields, for example, a logistics/distribution management, a baggage tracking management, a waste management, a parts management in manufacturing, a highway high-pass, a transportation card, a public transportation arrival information system, an anti-theft system, and an animal management. In particular, the RFID technology may be usefully employed in a logistics management system. When an RFID tag is attached to a product in a distribution center, sales, warehousing, shipping, and inventory may be checked in real time with an RFID reader, and the entire process of the product to a consumer through a store may be tracked. Accordingly, a processing speed may increase and management cost may be reduced, which may lead to greatly improving efficiency.

However, the conventional RFID reader may have a relatively large size and it may not be easy for a user to carry and use. Also, since the conventional RFID reader is not easy to use in combination with a predetermined computing device, the RFID may have a poor use convenience and usability and may also have a poor operation manipulative feature.

SUMMARY

A technical objective to be achieved by the present disclosure is to provide a radio frequency identification (RFID) reader that may have a compact size to be conveniently carried and easily used by a user and may improve a convenience, a usability, and an operation manipulative feature through easy combination and use with a host device.

Also, a technical objective to be achieved by the present disclosure is to provide an RFID system to which the aforementioned RFID reader is applied.

The objectives to be solved by the present disclosure are not limited to the aforementioned objectives and other objectives not described herein may be clearly understood by one of ordinary in the art from the following description.

According to example embodiments of the present disclosure, there is provided an RFID reader including an RFID reader body having a body that extends in a vertical direction and a protruding portion that protrudes rearward from an upper end of the body, an operation button being provided on a top surface of the protruding portion and a recess space being provided at the rear of the body under the protruding portion; a first back cover device detachably coupled to a rear surface of the body and having a band-type wearable member configured to be held by a user's hand or worn on the user's wrist; and a second back cover device detachably coupled to the rear surface of the body and having a pad mounting device configured to mount a pad type host device. The pad mounting device includes a first member of which a location is fixed on the rear surface of the body and including a guide portion that extends in the vertical direction and having a first limit portion at its upper end; and a second member provided to be movable in the vertical direction along the guide portion by coupling to the first member and having a second limit portion at its lower end, and the pad type host device is mounted between the first limit portion and the second limit portion, and one of the first back cover device and the second back cover device is configured to apply to the RFID reader body as needed.

In the case of applying the first back cover device to the RFID reader body, a radio signal may be configured to be transmitted from the RFID reader in such a manner that the user manipulates the operation button while holding the band-type wearable member by hand or wearing the same on the wrist.

The pad mounting device may have a straight structure that extends in the vertical direction, and a width of the pad mounting device may be within 1.3 times a width of the body.

The guide portion may include a guide hole structure or a guide groove structure.

An auxiliary operation button for operating the RFID reader may be further provided on a front surface of the body, and a radio signal may be configured to be transmitted from the RFID reader in response to a manipulation on the auxiliary operation button.

An auxiliary operation button for operating the RFID reader may be further provided on a front surface of the second member of the pad mounting device, and a radio signal may be configured to be transmitted from the RFID reader in response to a manipulation on the auxiliary operation button.

According to other example embodiments of the present disclosure, there is provided an RFID system including the aforementioned RFID reader; an RFID tag configured to be read by the RFID reader; and a host device configured to collect information read by the RFID reader.

According to some example embodiments, it is possible to implement an RFID reader that may have a compact size to be conveniently carried and easily used by a user and may improve a convenience, a usability, and an operation manipulative feature through easy combination and use with a host device and an RFID system including the same. Using the RFID reader according to example embodiments, a user convenience and a management efficiency may be greatly improved in the field of logistics/distribution management.

However, the effects of the present disclosure are not limited to the aforementioned effects and may be variously expanded without departing from the technical spirit and scope of the present disclosure.

BRIEF DESCRIPTION OF THE DRAWINGS

Various aspects are described with reference to the accompanying drawings and, herein, like reference numerals refer to like elements throughout. In the following example embodiments, numerous specific details are set forth herein to provide thorough understanding of at least one aspect for the purpose of explanation. However, it will be apparent that such aspect(s) may be practiced without the specific details. In other examples, known structures and devices are illustrated in a form of a block diagram to easily describe at least one aspect.

DETAILED DESCRIPTION

Hereinafter, example embodiments of the present disclosure are described in detail with reference to the accompanying drawings.

The example embodiments of the present disclosure to be described below are provided to more fully explain the present disclosure to one of ordinary sill in the art and the scope of the present disclosure is not limited to the example embodiments and the example embodiments may be modified in various different forms.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. In addition, the term "connection" used herein refers to a concept including not only a direct connection between certain members but also an indirect connection of another member further provided between members.

Also, when it is described that a member is located "on" another member herein, it indicates not only a case in which the member is in contact with the other member, but also a case in which still another member is present between two members. As used herein, the term "and/or" includes any one of the listed items or all possible combinations thereof. Also, as used herein, terms of degree, such as "about" and "substantially," are used in a range of or close to that number of degree by considering inherent manufacturing and material tolerance and are used to prevent infringers from unfairly using the stated disclosure in which accurate or absolute numbers provided to help understanding of the present application are described.

Hereinafter, example embodiments of the present disclosure are described in detail with reference to the accompanying drawings. Sizes or thicknesses of areas or parts illustrated in the accompanying drawings may be slightly exaggerated for clarity of the specification and convenience of description. Like reference numerals refer to like elements throughout the detailed description.

Figure 1:
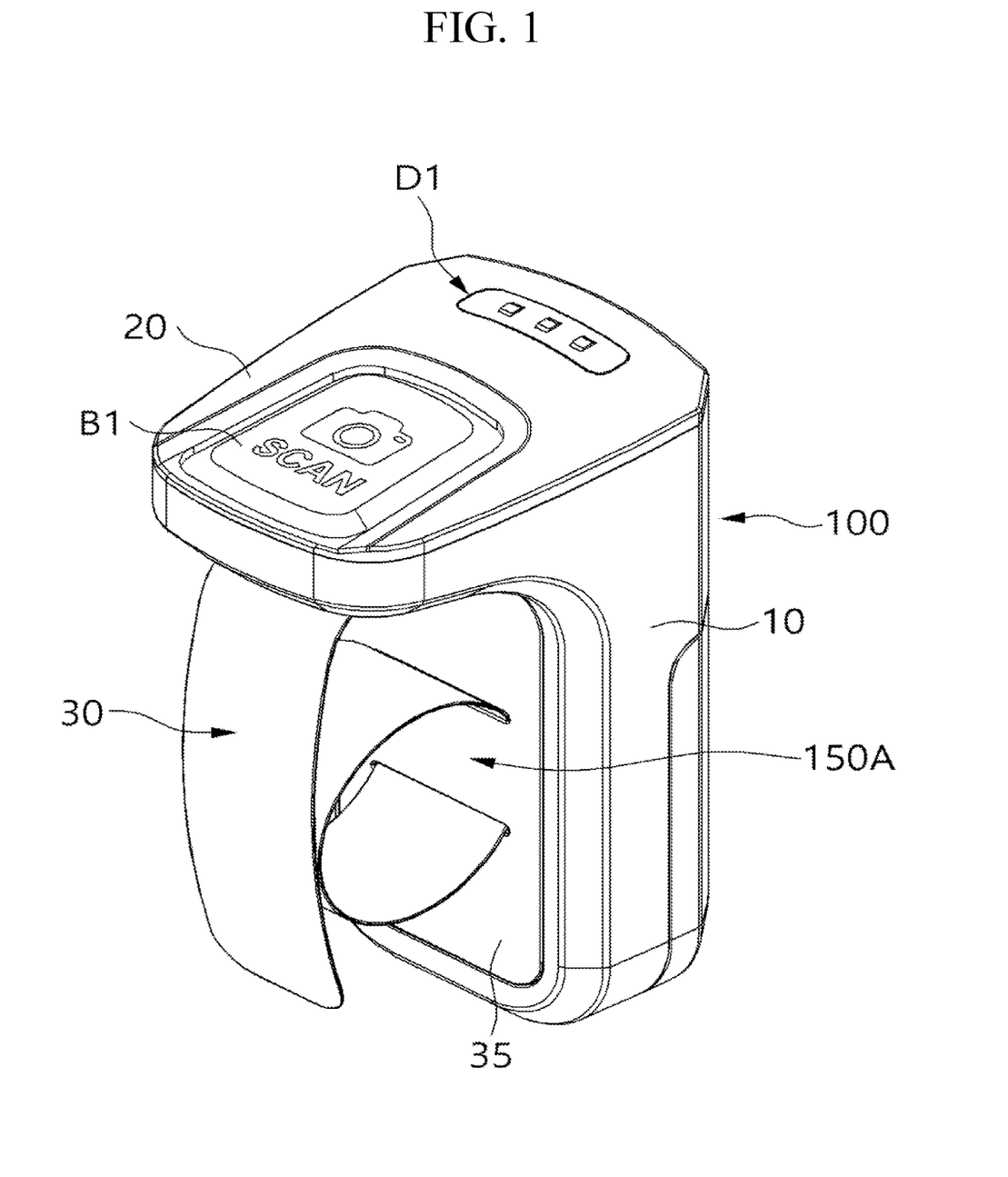
FIGS. 1 and 2 are perspective views illustrating a radio frequency identification (RFID) reader according to an example embodiment of the present disclosure.
Figure 2:
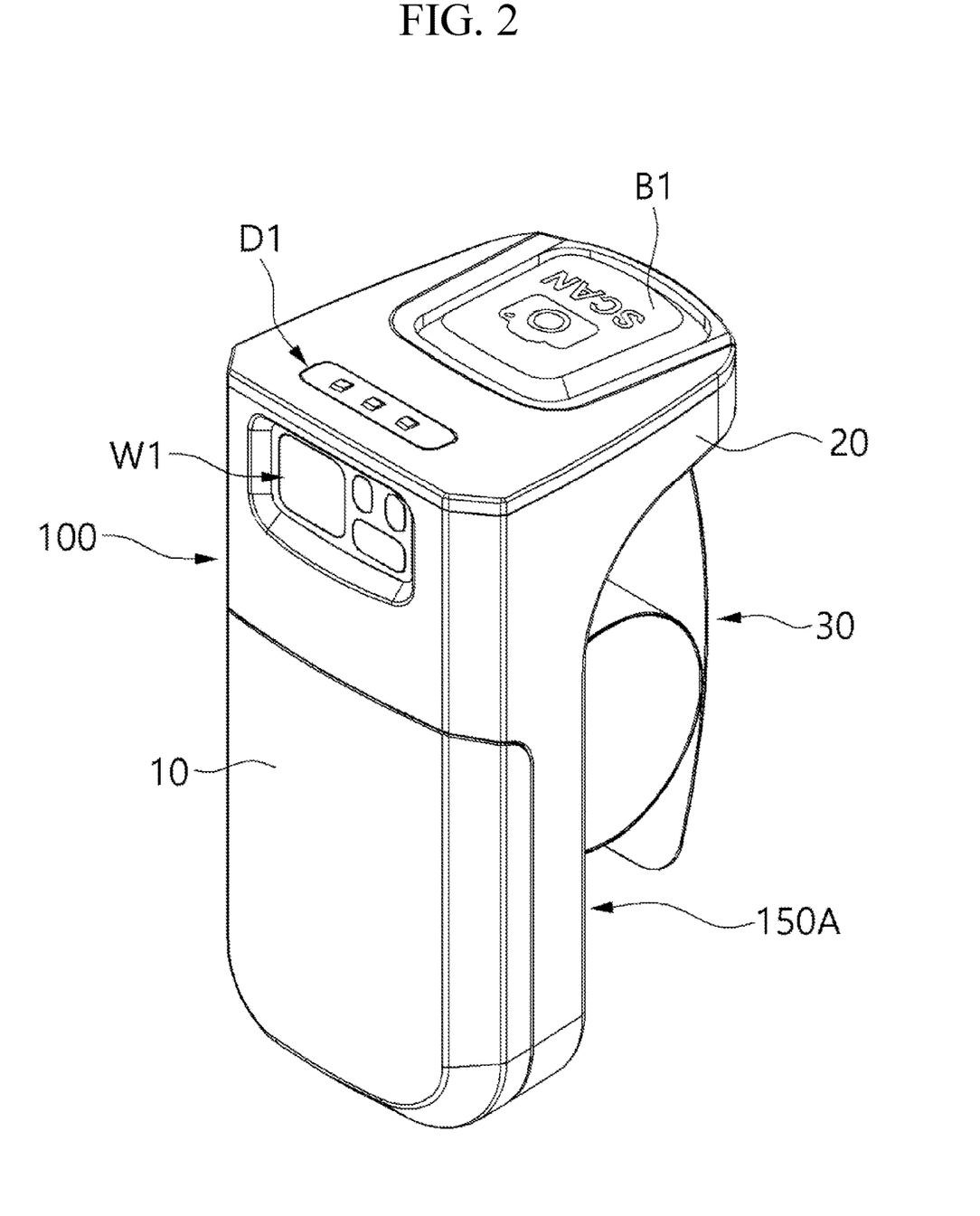

FIGS. 1 and 2 are perspective views illustrating a radio frequency identification (RFID) reader according to an example embodiment of the present disclosure. FIG. 1 illustrates a rear side of the RFID reader and FIG. 2 illustrates a front side of the RFID reader.

Referring to FIGS. 1 and 2, the RFID reader according to an example embodiment of the present disclosure may include an RFID reader body 100. The RFID reader body 100 may include a body (main body) 10 that extends in a vertical direction and a protruding portion 20 that protrudes rearward from an upper end of the body 10. An operation button B1 may be provided on a top surface of the protruding portion 20 and a recess space may be provided at the rear of the body 10 under the protruding portion 20. The RFID reader body 100 may have a structure of an inverted L shape, a structure of an approximate inverted L shape, or a structure similar thereto. An empty space under the protruding portion 20 may be the recess space.

The RFID reader may include a first back cover device 150A that is detachably coupled to a rear surface of the body 10. The first back cover device 150A may include a cover portion 35 configured to cover the rear surface of the body 10 and a band-type wearable member 30 configured to couple to the cover portion 35. The band-type wearable member 30 may be configured to be held by a user's hand or worn on the user's wrist. A portion or at least a portion of the band-type wearable member 30 may be manufactured of a flexible material. The user may hold the band-type wearable member 30 by inserting the user's fingers inward into the band-type wearable member 30 and may use the RFID reader while holding the band-type wearable member 30. Alternatively, the user may use the RFID reader while wearing the band-type wearable member 30 on the wrist by inserting the wrist into a loop of the band-type wearable member 30. The band-type wearable member 30 may have a configuration of being at least partially loosened and tightened. Therefore, the user may easily hold the band-type wearable member 30 by hand or may wear the same on the wrist.

The RFID reader may be a miniaturized and lightweight device and may be designed to be used easily and relatively readily while being held by the user' hand or worn on the wrist. The RFID reader may have a small size of less than about 16 centimeters (cm) in length, width, and height and may have a size and a weight that are easy to carry.

In the case of applying the first back cover device 150A to the RFID reader body 100, a radio signal may be transmitted from the RFID reader in such a manner that the user manipulates the operation button B1 while holding the band-type wearable member 30 by hand or wearing the same on the wrist. Through this, information of the RFID tag(s) may be read. Since the user may easily manipulate the operation button B1 while holding the band-type wearable member 30 or wearing the same on the wrist, the RFID reader may be very conveniently used. For example, while holding the band-type wearable member 30 by hand, the user may easily manipulate the operation button B1 with the thumb of the holding hand.

A window portion W1 for transmission and reception of radio signals may be provided on a front surface of the RFID reader body 100. The window portion W1 may be provided in an upper portion of a front portion of the body 10. Also, a display D1 may be provided on the top surface of the RFID reader body 100. For example, the display D1 may include at least one light emitting diode (LED) element. The display D1 may serve to display a feedback signal related to use of the RFID reader for the user. Also, the RFID reader may further include a speaker or a vibration generator for delivering the feedback signal to the user in addition to the display D1.

Figure 3:
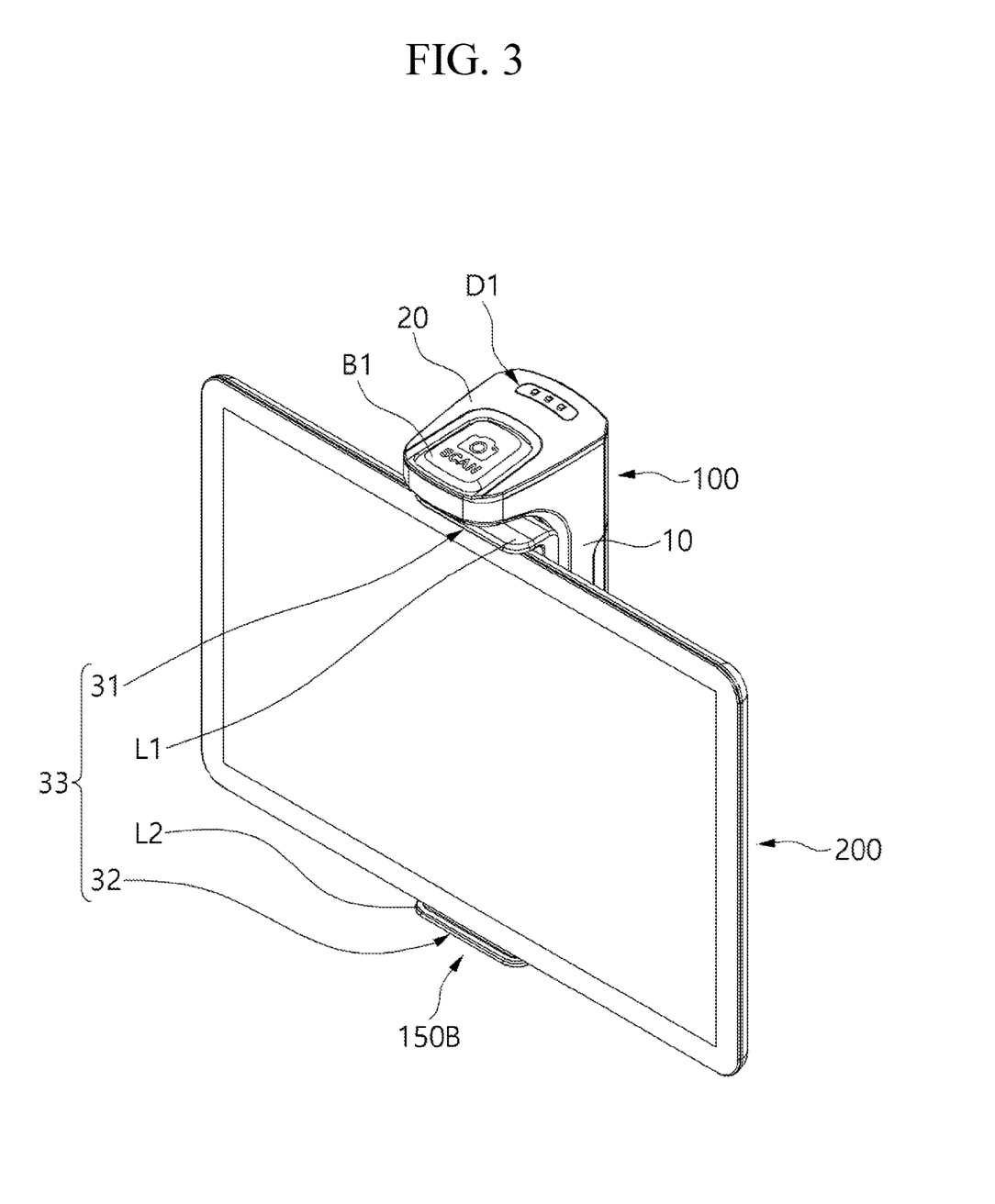
FIGS. 3 to 5 are perspective views illustrating an RFID reader according to an example embodiment of the present disclosure.
Figure 4:
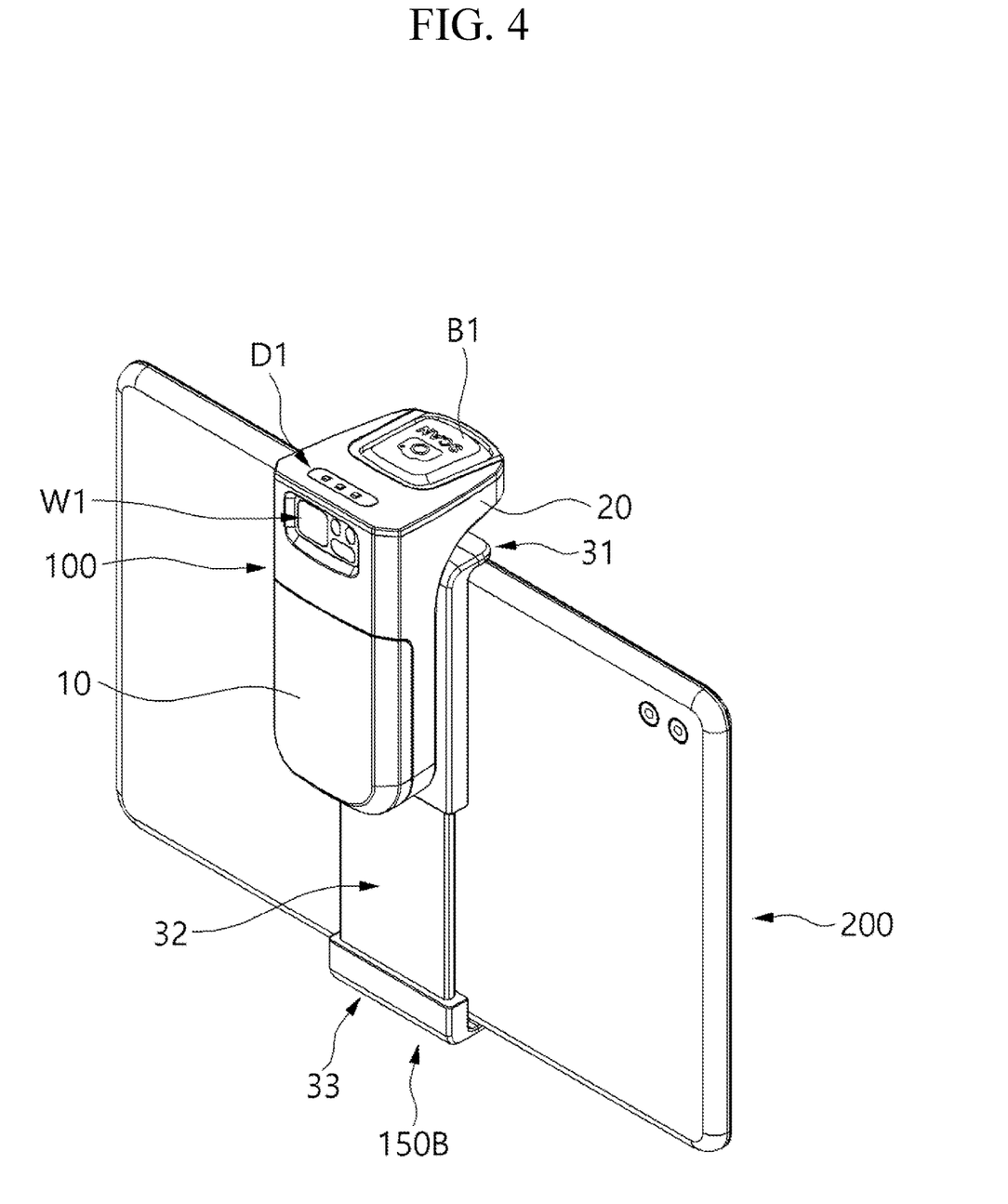
Figure 5:
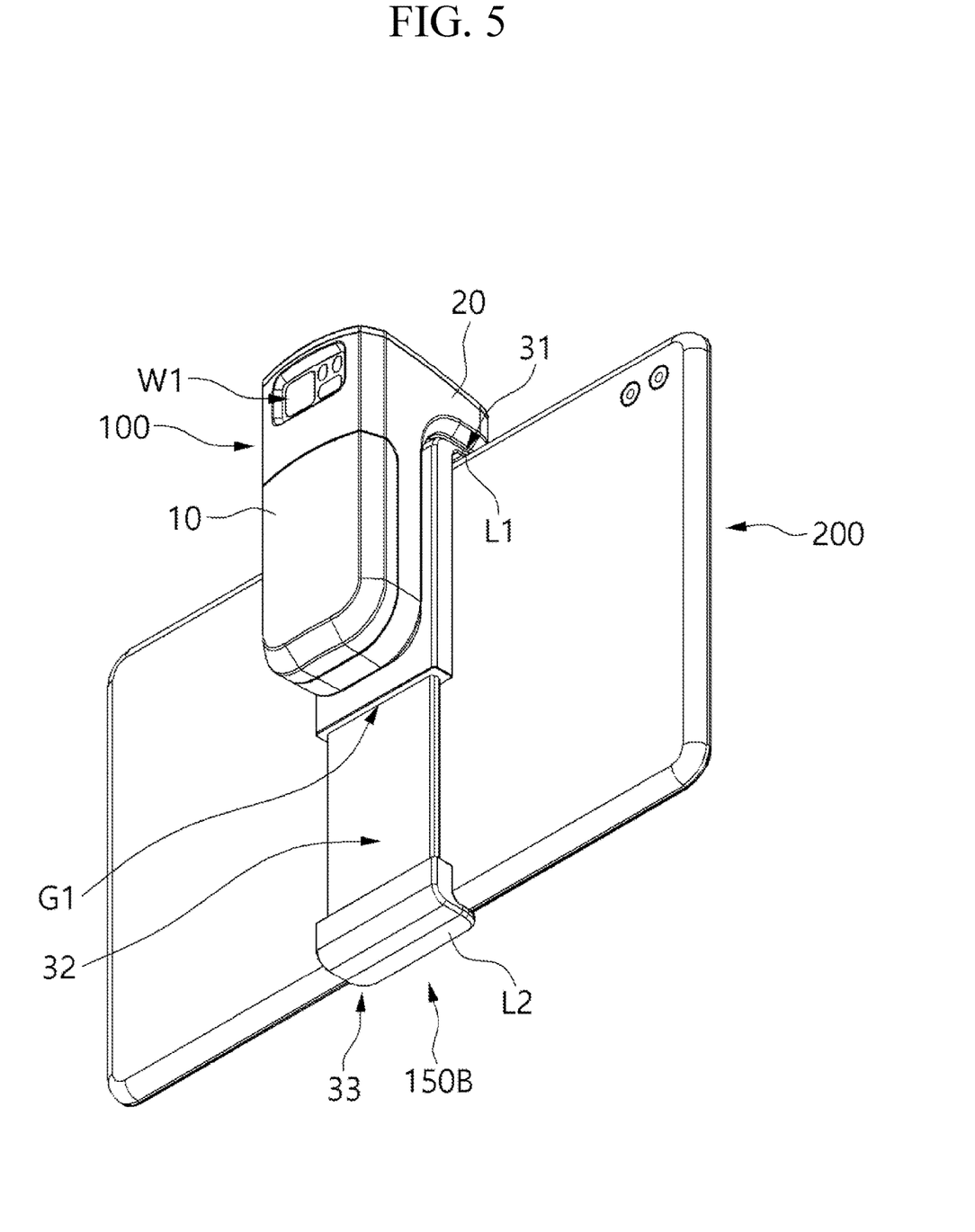

FIGS. 3 to 5 are perspective views illustrating an RFID reader according to an example embodiment of the present disclosure. FIG. 3 illustrates a rear side of the RFID reader and FIGS. 4 and 5 illustrate a front side of the RFID reader viewed at different angles.

Referring to FIGS. 3 to 5, the RFID reader according to an example embodiment of the present disclosure may include the RFID reader body 100. The RFID reader body 100 may be the same as described above with reference to FIGS. 1 and 2. The RFID reader body 100 may include the body (main body) 10 that extends in the vertical direction and the protruding portion 20 that protrudes rearward from the upper end of the body 10. The operation button B1 may be provided on the top surface of the protruding portion 20 and the recess space may be provided at the rear of the body 10 under the protruding portion 20. Additionally, the window portion W1 and the display D1 of the RFID reader body 100 may be further included.

The RFID reader may include a second back cover device 150B that is detachably coupled to the rear surface of the body 10. The second back cover device 150B may include a cover portion (not shown) configured to cover the rear surface of the body 10 and a pad mounting device 33 configured to couple to the cover portion. The pad mounting device 33 may be a device for mounting a pad type host device 200. The pad type host device 200 may be a pad type computer.

The pad mounting device 33 may be locationally fixed on the rear surface of the body 10 and may include a first member 31 having a guide portion G1 that extends in the vertical direction and having a first limit portion (L1) at its upper end. Also, the pad mounting device 33 may include a second member 32 provided to be movable in the vertical direction along the guide portion G1 by coupling to the first member 31 and having a second limit portion (L2) at its lower end.

The first member 31 may extend in the vertical direction and the first limit portion (L1) may extend in a horizontal direction rearward from the upper end of the first member 31. The second member 32 may extend in the vertical direction and the second limit portion (L2) may extend in the horizontal direction rearward from the lower end of the second member 32. A portion of the second member 32 may be provided within the guide portion G1 and may move in the vertical direction along the guide portion G1. The pad type host device 200 may be mounted between the first limit portion (L1) and the second limit portion (L2). The first member 31 and the second member 32 may be configured to elastically hold the pad type host device 200.

In the case of applying the second back cover device 150B to the RFID reader body 100, the user may use the RFID reader in a state in which the pad type host device 200 is mounted to the pad mounting device 33. The user may use the RFID reader while verifying the pad type host device 200 mounted to the pad mounting device 33 or manipulating the same. Here, the user may use the RFID reader with the pad type host device 200 while holding a predetermined portion of the pad type host device 200 by hand. Therefore, in this regard, use convenience of the RFID reader may be improved.

The RFID reader according to an example embodiment may be configured to apply one of the aforementioned first back cover device 150A of FIGS. 1 and 2 and the aforementioned second back cover device 150B of FIGS. 3 to 5 to the RFID reader body 100 if necessary. According to a situation and a necessity, the RFID reader may apply and use the first back cover device 150A of FIGS. 1 and 2 or may apply and use the second back cover device 150B of FIGS. 3 to 5.

According to an example embodiment, the pad mounting device 33 may have a straight structure that extends in the vertical direction. Also, a width of the pad mounting device 33 may be within about 1.3 times a width of the body 10. The width of the pad mounting device 33 may be about 0.5 times to about 1.3 times the width of the body 10. Therefore, the pad mounting device 33 may have a significantly compact size. Also, the pad type host device 200 in various sizes may be stably mounted to the pad mounting device 33 and used. Since various sizes of the pad type host device 200 are easily applicable, the use convenience may be further improved in this regard.

According to an example embodiment, the guide portion G1 of FIG. 5 of the first member 31 may include a guide hole structure or a guide groove structure. The example embodiment of FIG. 5 illustrates a case in which the guide portion G1 has the guide hole structure. The guide portion G1 having a hole structure formed vertically within a body of the first member 31 from the lower end of the first member 31 may be provided. The second member 32 may be configured to be movable in the vertical direction within the guide portion G1. In the case of using the guide portion G1, it may be advantageous in securing a stable movement and structural strength of the second member 32. However, the structure of the guide portion G1 and a combination type of the first member 31 and the second member 32 of FIG. 5 are provided as an example only and may be modified.

Figure 6:
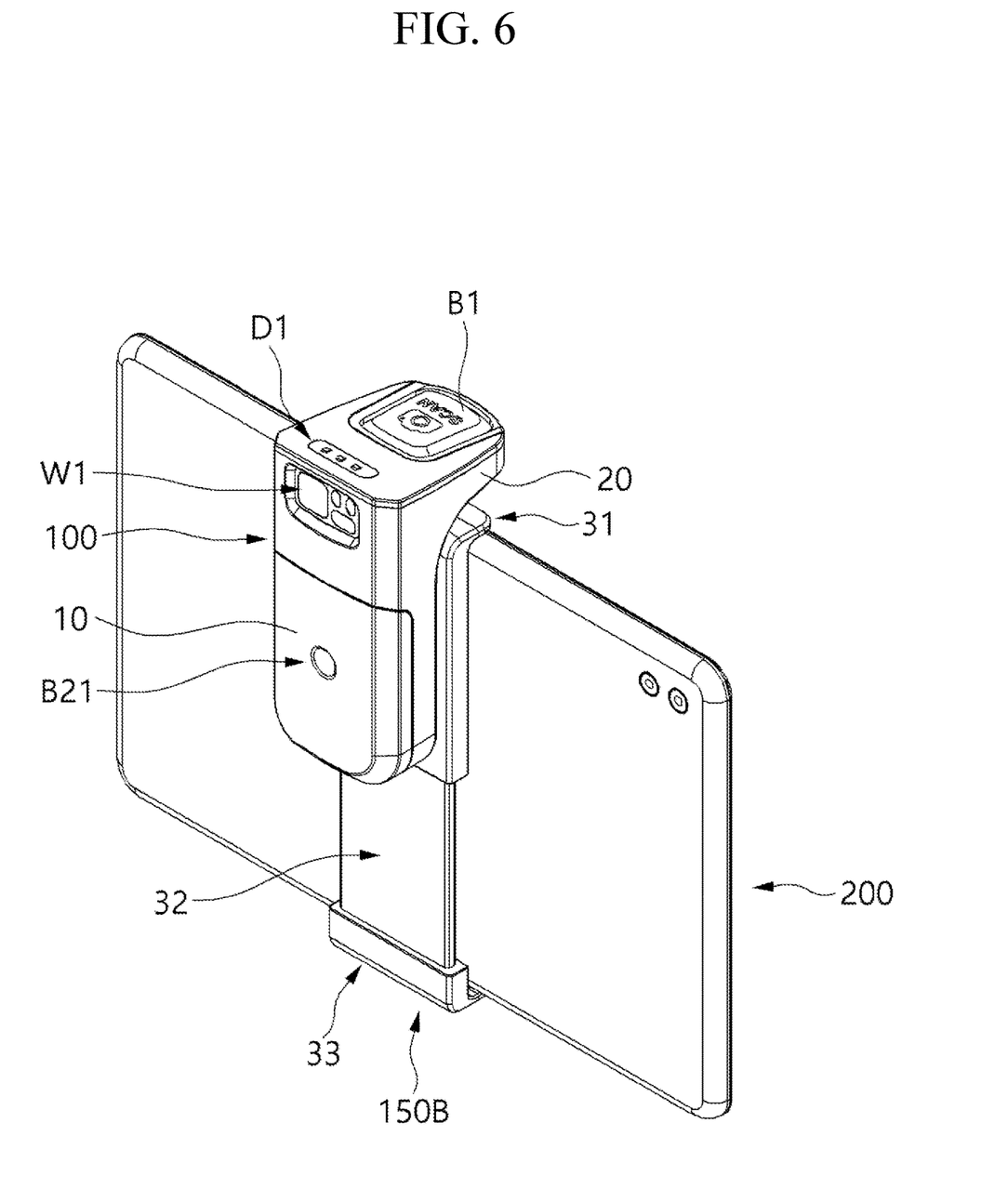
FIG. 6 is a perspective view illustrating an RFID reader according to another example embodiment of the present disclosure.

FIG. 6 is a perspective view illustrating an RFID reader according to another example embodiment of the present disclosure.

Referring to FIG. 6, in the RFID reader according to the example embodiment, an auxiliary operation button B21 for operating the RFID reader may be further provided on a front surface of the body 10. A radio signal may be transmitted from the RFID reader in response to a manipulation on the auxiliary operation button B21. The user may operate the RFID reader by manipulating not only the operation button B1 provided on the top surface of the protruding portion 20 but also the auxiliary operation button B21 provided on the front surface of the body 10. In this regard, use convenience and operational manipulability may be improved. For example, the user may manipulate the auxiliary operation button B21 using an index finger with the pad type host device 200 mounted to the pad mounting device 33

Figure 7:
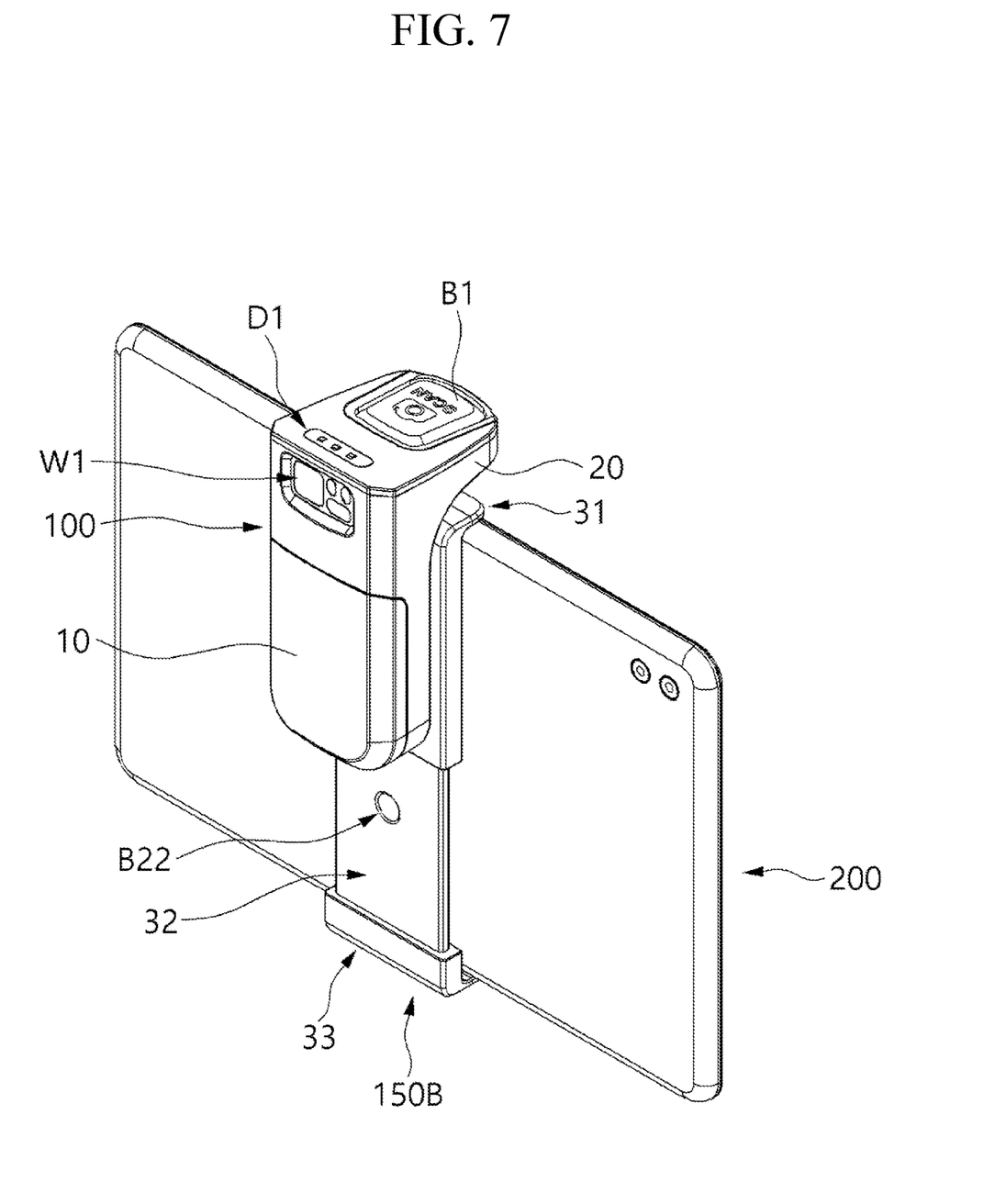
FIG. 7 is a perspective view illustrating an RFID reader according to another example embodiment of the present disclosure.

FIG. 7 is a perspective view illustrating an RFID reader according to another example embodiment of the present disclosure.

Referring to FIG. 7, in the RFID reader according to the example embodiment, an auxiliary operation button B22 for operating the RFID reader may be further provided on a front surface of the second member 32 of the pad mounting device 33. A radio signal may be transmitted from the RFID reader in response to a manipulation on the auxiliary operation button B22. Here, the auxiliary operation button B22 may have, for example, a button shape that does not protrude and may not interfere with a vertical movement of the second member 32. Also, the auxiliary operation button B22 may be electrically connected to a circuit device of the body 10 through internal wiring. The user may operate the RFID reader by manipulating not only the operation button B1 provided on the top surface of the protruding portion 20 but also the auxiliary operation button B22 provided on the front surface of the second member 32. In this regard, use convenience and operational manipulability may be improved. For example, in a state in which the pad type host device 200 is mounted to the pad mounting device 33, the user may manipulate the auxiliary operation button B22 with an index finger. Since the auxiliary operation button B22 of FIG. 7 is provided below the auxiliary operation button B21 of FIG. 6, it may be easier for the user to manipulate the same by hand.

According to an example embodiment, the RFID reader may improve efficiency of RFID read for products in conjunction with the pad type host device 200. In detail, the RFID reader may manage product information by acquiring read information of individual products. In this process, the RFID reader may verify product information by comparing product information acquired through the RFID tag and product information acquired by recognizing an image of a product captured through the pad type host device 200 (e.g., image recognition based on a pretrained artificial neural network). In this manner, accuracy of RFID reading may be improved.

Additionally, the RFID reader may quickly read product information through interaction with the pad type host device 200 in a situation in which a plurality of products are placed on a pallet. In detail, the RFID reader may recognize product information through tagging on one of the plurality of products, and may simultaneously recognize product information on the plurality of products by detecting a product recognized through tagging from a photo of the plurality of products captured through the interacting pad type host device 200. Through this manner, although there are many products, it is possible to quickly proceed with warehousing and shipping. In addition, by recognizing product information even at a long distance through image recognition, it is possible to provide a method capable of improving a distance limitation of the RFID reader.

Also, only when an error occurs in reading product information based on an error of the RFID tag, the RFID reader may acquire a product image through the pad type host device 200 and may perform an operation of recognizing product information from the product image. In this manner, it is possible to provide a method capable of preparing for a situation in which an error occurs in reading product information due to damage of the RFID tag.

Also, when warehousing and shipping of products is completed by reading product information through RFID tagging on a plurality of products, the RFID reader may extract an image of a product of which reading is completed through the pad type host device 200, may identify a product that is missing in reading through product information recognition in the image, and may provide the identified product to a display of the pad type host device 200, thereby providing information regarding whether missing information is present when processing information on the plurality of products.

Figure 8:
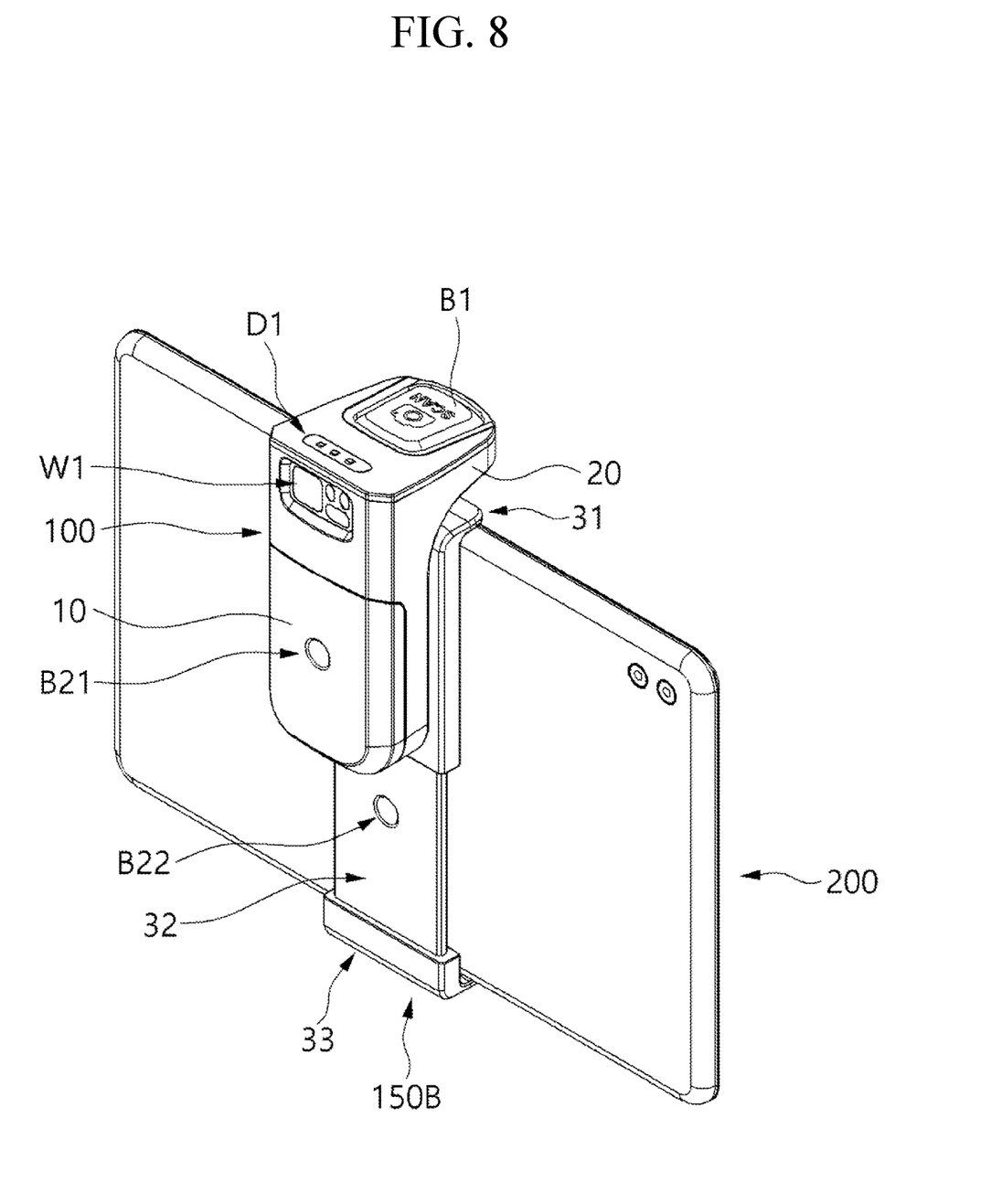
FIG. 8 is a perspective view illustrating an RFID reader according to another example embodiment of the present disclosure.

FIG. 8 is a perspective view illustrating an RFID reader according to another example embodiment of the present disclosure.

Referring to FIG. 8, the RFID reader according to the example embodiment may include all of the auxiliary operation button B21 of FIG. 6 and the auxiliary operation button B22 of FIG. 7. The auxiliary operation button B21 may be referred to as a first auxiliary operation button B21, and the auxiliary operation button B22 may be referred to as a second auxiliary operation button B22. The plurality of auxiliary operation buttons B21 and B22 may be applied and selectively used depending on cases.

Figure 9:
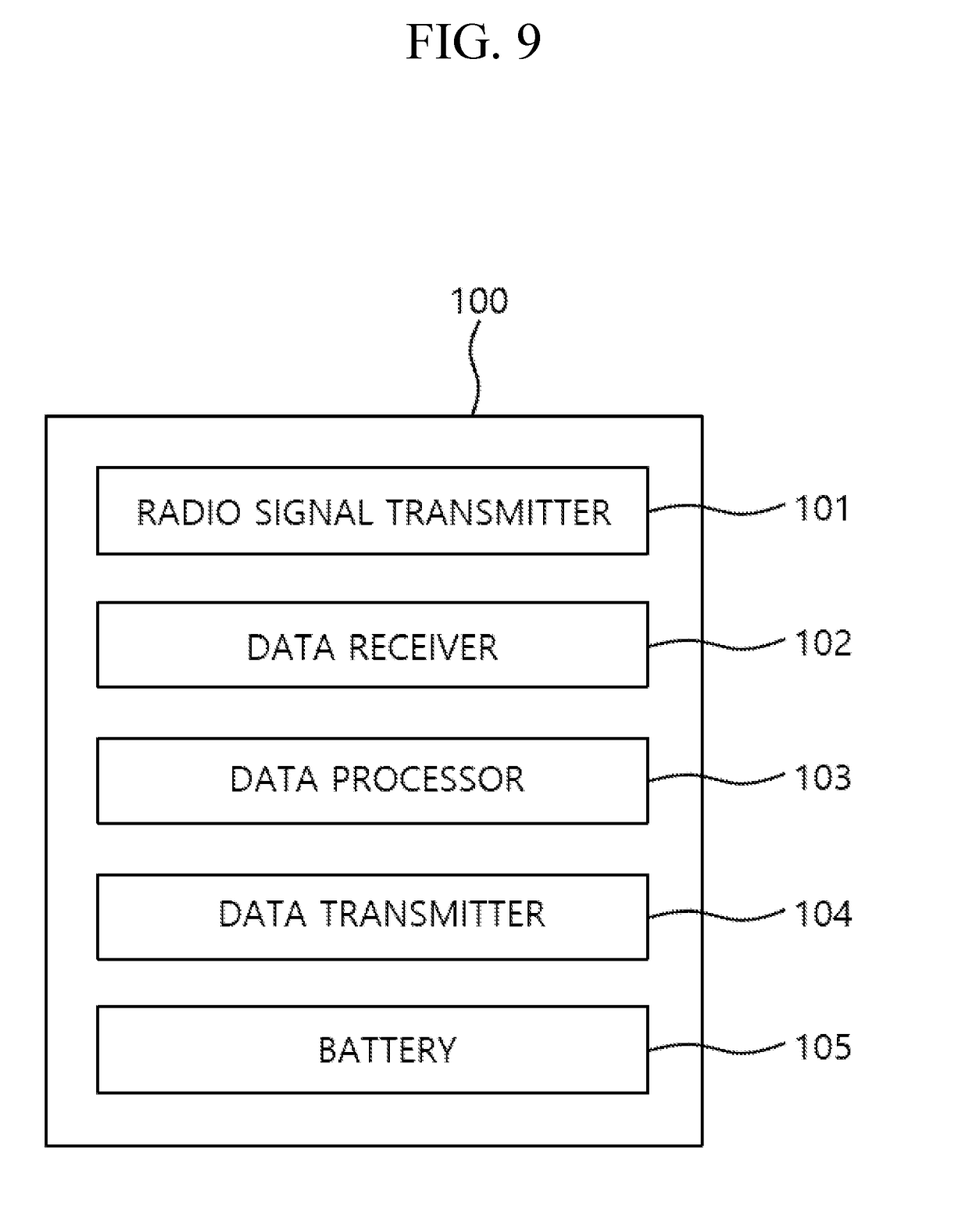
FIG. 9 is a block diagram illustrating a configuration of an RFID reader body applicable to an RFID reader according to an example embodiment of the present disclosure.

FIG. 9 is a block diagram illustrating a configuration of an RFID reader body 100 applicable to an RFID reader according to an example embodiment of the present disclosure.

Referring to FIG. 9, the RFID reader body 100 applicable to the RFID reader according to an example embodiment of the present disclosure may include a radio signal transmitter 101 configured to transmit a radio signal to an RFID tag. The RFID reader body 100 may include a data receiver 102 configured to receive data transmitted from the RFID tag. The RFID reader body 100 may include a data processor 103 configured to interpret/modulate the data received from the RFID tag. The RFID reader body 100 may include a data transmitter 104 configured to transmit data processed by the data processor 103 to a predetermined host device, for example, a type of a server. The data receiver 102 and the data transmitter 104 may be a type of a data communicator. Data communication may be performed in a wireless manner and, if necessary, may be performed in a wired manner. The data processor 103 may be implemented as a microprocessor. Also, the RFID reader body 100 may include a battery 105 configured to supply power. The battery 105 may be a chargeable battery and may also be a replaceable battery. However, a configuration of the RFID reader body 100 shown in FIG. 9 is provided as an example only and may vary depending on cases.

Figure 10:
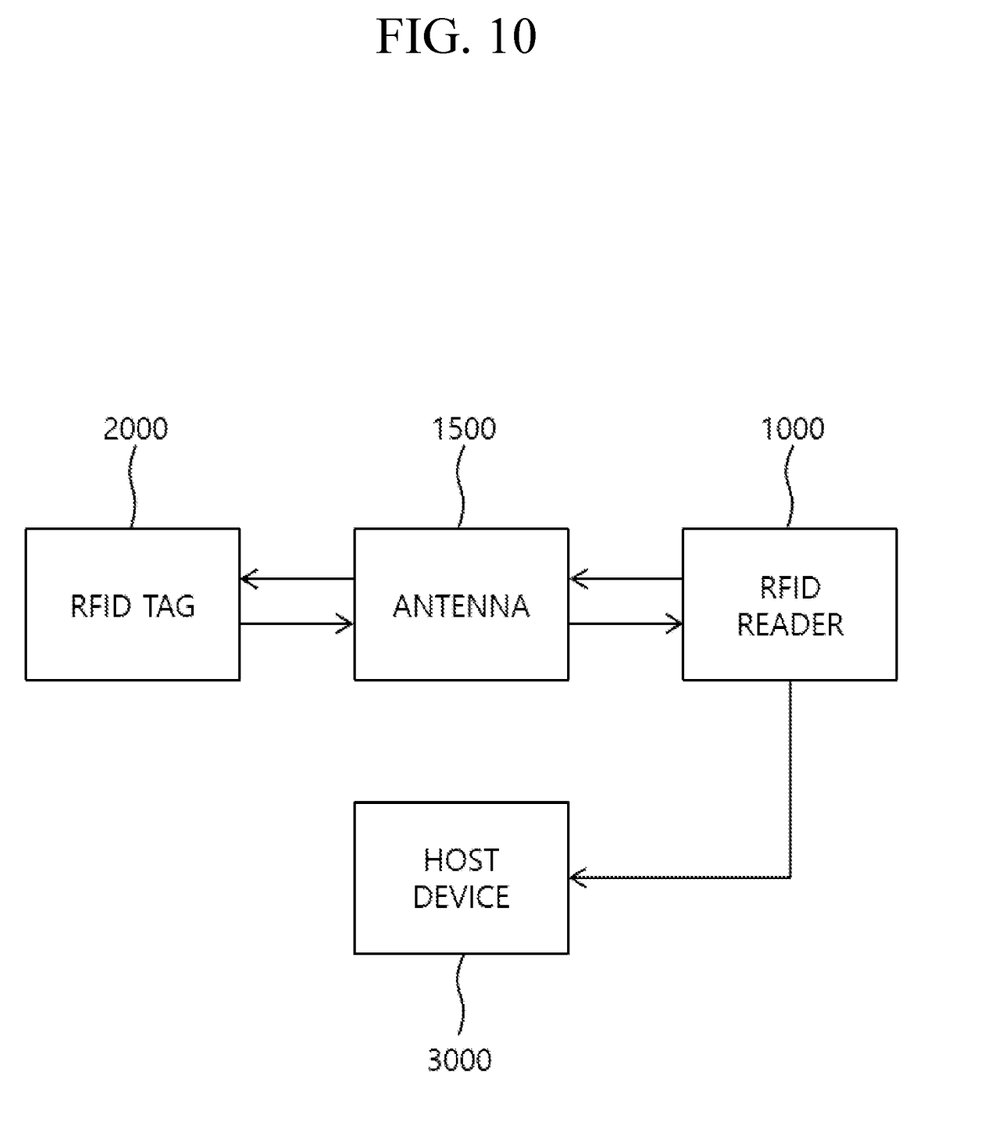
FIG. 10 is a block diagram illustrating an RFID system including an RFID reader according to an example embodiment of the present disclosure.

FIG. 10 is a block diagram illustrating an RFID system including an RFID reader 1000 according to an example embodiment of the present disclosure.

Referring to FIG. 10, the RFID system according to an example embodiment of the present disclosure may include the RFID reader 1000, an RFID tag 2000 configured to be read by the RFID reader 1000, and a host device 3000 configured to collect information read by the RFID reader 1000. An antenna 1500 may be further provided between the RFID reader 1000 and the RFID tag 2000. In this case, the antenna 1500 may serve to relay transmission and reception of radio waves and data. The RFID reader 1000 may have a structure and a configuration described above with reference to FIGS. 1 to 9. The host device 3000 may have a pad type or may have other various types and shapes.

According to the aforementioned example embodiments of the present disclosure, it is possible to implement an RFID reader that may have a compact size to be conveniently carried and easily used by a user and may improve a convenience, a usability, and an operation manipulative feature through easy combination and use with a host device and an RFID system including the same. Using the RFID reader according to example embodiments, a user convenience and a management efficiency may be greatly improved in the field of logistics/distribution management.

In the present specification, although example embodiments of the present disclosure are disclosed and specific terms are used, they are simply used in general sense to easily describe technical contents of the present disclosure and help understanding of the present disclosure and not construed as limiting the scope of the present disclosure. It is obvious to one of ordinary skill in the art to which the present disclosure pertains that other modifications based on the technical spirit of the present disclosure may be made in addition to the example embodiments disclosed herein. For example, it will be apparent to one of ordinary skill in the art that the RFID reader according to example embodiments described with reference to FIGS. 1 to 10 and the RFID system including the same may be modified in various forms. Therefore, the scope of the disclosure should be determined by the technical spirit described in the claims, not by the example embodiments.

What is claimed is:

1. A radio frequency identification (RFID) system comprising:
   an RFID reader;
   an RFID tag configured to be read by the RFID reader; and
   a host device configured to collect information read by the RFID reader,
   wherein the RFID reader comprises:
   an RFID reader body having a body that extends in a vertical direction and a protruding portion that protrudes rearward from an upper end of the body, an operation button being provided on a top surface of the protruding portion and a recess space being provided at the rear of the body under the protruding portion;
   a first back cover device detachably coupled to a rear surface of the body and having a wearable member configured to be held by a user's hand or worn on a user's wrist; and
   a second back cover device detachably coupled to the rear surface of the body and having a pad mounting device configured to mount the host device,
   wherein the pad mounting device is locationally fixed on the rear surface of the body and comprises a first member having a guide portion that extends in the vertical direction and having a first limit portion at the pad mounting device upper end; and a second member provided to be movable in the vertical direction along the guide portion by coupling to the first member and having a second limit portion at the pad mounting device lower end,
   wherein the wearable member comprises a band,
   wherein the host device is mounted between the first limit portion and the second limit portion,
   wherein one of the first back cover device and the second back cover device is configured to apply to the RFID reader body as needed,
   wherein in the case of applying the first back cover device to the RFID reader body, a radio signal is configured to be transmitted from the RFID reader in such a manner that the user manipulates the operation button while holding the wearable member by hand or wearing the wearable member on the wrist,
   wherein the pad mounting device has a straight structure that extends in the vertical direction,
   wherein a width of the pad mounting device is within 1.3 times a width of the body,
   wherein the guide portion includes a guide hole structure or a guide groove structure,
   wherein a first auxiliary operation button for operating the RFID reader is further provided on a front surface of the body,
   wherein the radio signal is configured to be transmitted from the RFID reader in response to a manipulation on the first auxiliary operation button,
   wherein a second auxiliary operation button for operating the RFID reader is further provided on a front surface of the second member of the pad mounting device,
   wherein the radio signal is configured to be transmitted from the RFID reader in response to a manipulation on the second auxiliary operation button,
   wherein the second auxiliary operation button is provided in a form of a button that does not protrude and electrically connected to a circuit device of the body through internal wiring, and provided relatively lower than the first auxiliary operation button,
   wherein the RFID system is configured to:
   verify product information through comparison between first product information acquired through the RFID tag and second product information acquired by recognizing an image of a product captured through the host device;
   recognize product information through RFID tagging on one of a plurality of products using the RFID reader in a situation which the plurality of products are placed on a pallet and simultaneously recognize product information on the plurality of products by detecting a product recognized through tagging from a photo of the plurality of products captured through the host device;
   support product recognition at a long distance by recognizing product information through the image captured through the host device;
   support acquisition of an additional image through the host device and recognition of product information through the acquired additional image in a situation in which an error occurs in reading product information based on an error of the RFID tag; and
   support a function of extracting an image of a product of which warehousing and shipping is completed through the host device, recognizing product information from the extracted image of the product, and identifying product information on a product that is missing in warehousing and shipping through RFID tagging, after warehousing and shipping of products is completed by reading product information through the RFID tag of the RFID reader.

\* \* \* \* \*